United States Patent
Jang et al.

(10) Patent No.: US 10,971,303 B2
(45) Date of Patent: Apr. 6, 2021

(54) MULTILAYER ELECTRONIC COMPONENT

(71) Applicant: SAMSUNG ELECTRO-MECHANICS CO., LTD., Suwon-si (KR)

(72) Inventors: Young Su Jang, Suwon-si (KR); Won Sik Chong, Suwon-si (KR); Min Ha Hwang, Suwon-si (KR); Jun Boum Lim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 330 days.

(21) Appl. No.: 15/673,120

(22) Filed: Aug. 9, 2017

(65) Prior Publication Data
US 2018/0122575 A1    May 3, 2018

(30) Foreign Application Priority Data

Nov. 1, 2016   (KR) .......................... 10-2016-0144710

(51) Int. Cl.
*H01G 4/232*   (2006.01)
*H01G 4/012*   (2006.01)
(Continued)

(52) U.S. Cl.
CPC ............. *H01G 4/232* (2013.01); *H01G 2/065* (2013.01); *H01G 4/012* (2013.01); *H01G 4/12* (2013.01); *H01G 4/30* (2013.01)

(58) Field of Classification Search
CPC ............ H01G 4/30; H01G 4/12; H01G 4/228; H01G 4/232; H01G 4/236
See application file for complete search history.

(56) References Cited

U.S. PATENT DOCUMENTS 6,370,010 B1 *  4/2002  Kuroda ................. H01G 4/232
                                                 361/303
2006/0198079 A1   9/2006  Shim et al.
(Continued)

FOREIGN PATENT DOCUMENTS

CN       1832070 A    9/2006
CN     101752084 A    6/2010
(Continued)

OTHER PUBLICATIONS

Office Action issued in Chinese Application No. 201710904770.2 dated Jul. 12, 2019, with English translation.

*Primary Examiner* — Eric W Thomas
(74) *Attorney, Agent, or Firm* — Morgan, Lewis & Bockius LLP

(57) ABSTRACT

A multilayer electronic component includes first and second external electrodes disposed on one surface of the body, the first internal electrode and the first external electrode being connected by a first via disposed within the body, the second internal electrode and the second external electrode being connected by a second via disposed within the body, the first internal electrode including first and second through portions, and the second internal electrode including third and fourth through portions, the first via penetrating alternately through the first through portion and the third through portion, the second via penetrating alternately through the second through portion and the fourth through portion, and a lead portion of the first via being connected to one end portion of the first external electrode, and a lead portion of the second via being connected to one end portion of the second external electrode.

13 Claims, 9 Drawing Sheets

(51) Int. Cl.
*H01G 2/06* (2006.01)
*H01G 4/12* (2006.01)
*H01G 4/30* (2006.01)

(56) References Cited

U.S. PATENT DOCUMENTS

| | | | |
|---|---|---|---|
| 2007/0064374 A1* | 3/2007 | Togashi | H01G 4/232 361/307 |
| 2008/0043400 A1 | 2/2008 | Fukudome et al. | |
| 2010/0128411 A1 | 5/2010 | Onishi et al. | |
| 2012/0039016 A1* | 2/2012 | Togashi | H01G 4/35 361/302 |
| 2012/0327556 A1 | 12/2012 | Ahn et al. | |
| 2015/0124371 A1 | 5/2015 | Park et al. | |
| 2018/0068793 A1* | 3/2018 | Lee | H01G 4/012 |

FOREIGN PATENT DOCUMENTS

| | | |
|---|---|---|
| CN | 102655055 A | 9/2012 |
| CN | 104637680 A | 5/2015 |
| JP | H10-270282 A | 10/1998 |
| JP | H11-214249 A | 8/1999 |
| JP | 2008-078622 A | 4/2008 |
| KR | 10-2013-0006798 A | 1/2013 |

* cited by examiner

MULTILAYER ELECTRONIC COMPONENT

CROSS-REFERENCE TO RELATED APPLICATION(S)

This application claims the benefit of priority to Korean Patent Application No. 10-2016-0144710, filed on Nov. 1, 2016 with the Korean Intellectual Property Office, the disclosure of which is incorporated herein by reference in its entirety.

TECHNICAL FIELD

The present disclosure relates to a multilayer electronic component and, more particularly, to a multilayer ceramic capacitor including a ceramic layer and at least a pair of internal electrodes.

BACKGROUND

A multilayer ceramic capacitor (MLCC), which is a multilayer electronic component, is a chip-type condenser installed on boards of various electronic products, such as video displays including a liquid crystal display (LCD), a plasma display panel (PDP), computers, personal digital assistants (PDAs), smartphones, mobile phones, and the like, to charge or discharge electricity.

As seen in Korean Laid-Open Patent Publication No. 2013-0006798, an MLCC is generally configured such that internal electrodes and external electrodes are connected on side surfaces of the capacitor. However, when the external electrodes and the internal electrodes are connected on side surfaces of the capacitor, it is impossible to further dispose a dielectric layer or an internal electrode on the side surface of the capacitor and maintain the same chip size, leading to a limitation in capacitance of the capacitor.

SUMMARY

An aspect of the present disclosure may provide a multilayer electronic component having a structure reducing ESL related to a current path, while increasing capacitance thereof.

According to an aspect of the present disclosure, a two-terminal multilayer electronic component may include: a body having a multilayer structure including a plurality of dielectric layers and first and second internal electrodes separated by the plurality of dielectric layers; and first and second external electrodes disposed on one surface of the body and connected to the first and second internal electrodes, respectively, wherein the first internal electrode and the first external electrode are connected by a first via disposed within the body, the second internal electrode and the second external electrode are connected by a second via disposed within the body, the first internal electrode includes first and second through portions, the second internal electrode includes third and fourth through portions, the first via alternately penetrates through the first through portion and the third through portion, the second via alternately penetrates through the second through portion and the fourth through portion, and a lead portion of the first via is connected to one end portion of the first external electrode, and a lead portion of the second via is connected to one end portion of the second external electrode.

According to another aspect of the present disclosure, a three-terminal multilayer electronic component may include: a body having a multilayer structure including a plurality of dielectric layers and first and second internal electrodes separated by the plurality of dielectric layers; first and second external electrodes disposed on one surface of the body and connected to the first internal electrode, and a third external electrode disposed between the first and second external electrodes on the one surface of the body and connected to the second internal electrode.

The first internal electrode is connected to the first external electrode through a first via disposed within the body, and connected to the second external electrode through a second via disposed within the body; the second internal electrode is connected to the third external electrode through a third via disposed within the body and connected to the fourth external electrode through a fourth via disposed within the body; the first internal electrode includes first to fourth through portions, the second internal electrode includes fifth to eighth through portions, the first via alternately penetrates through the first through portion and the fifth through portion, and a lead portion of the first via is connected to one end portion of the first external electrode, the second via alternately penetrates through the fourth through portion and the eighth through portion, and a lead portion of the second via is connected to one end portion of the second external electrode, the third via alternately penetrates through the second through portion and the sixth through portion, and a lead portion of the third via is connected to one end portion of the third external electrode, and the fourth via alternately penetrates through the third through portion and the seventh through portion, and a lead portion of the fourth via is connected to the other end portion of the third external electrode facing the one end portion of the third external electrode.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Exemplary embodiments of the present disclosure will now be described in detail with reference to the accompanying drawings.

Hereinafter, a multilayer electronic component according to exemplary embodiments of the present disclosure will be described, but the present disclosure is not limited thereto.

For the purposes of description, a 2-terminal multilayer electronic component will be described first, and a three-terminal multilayer electronic component will subsequently be described.

Two-Terminal Multilayer Electronic Component

Figure 1:
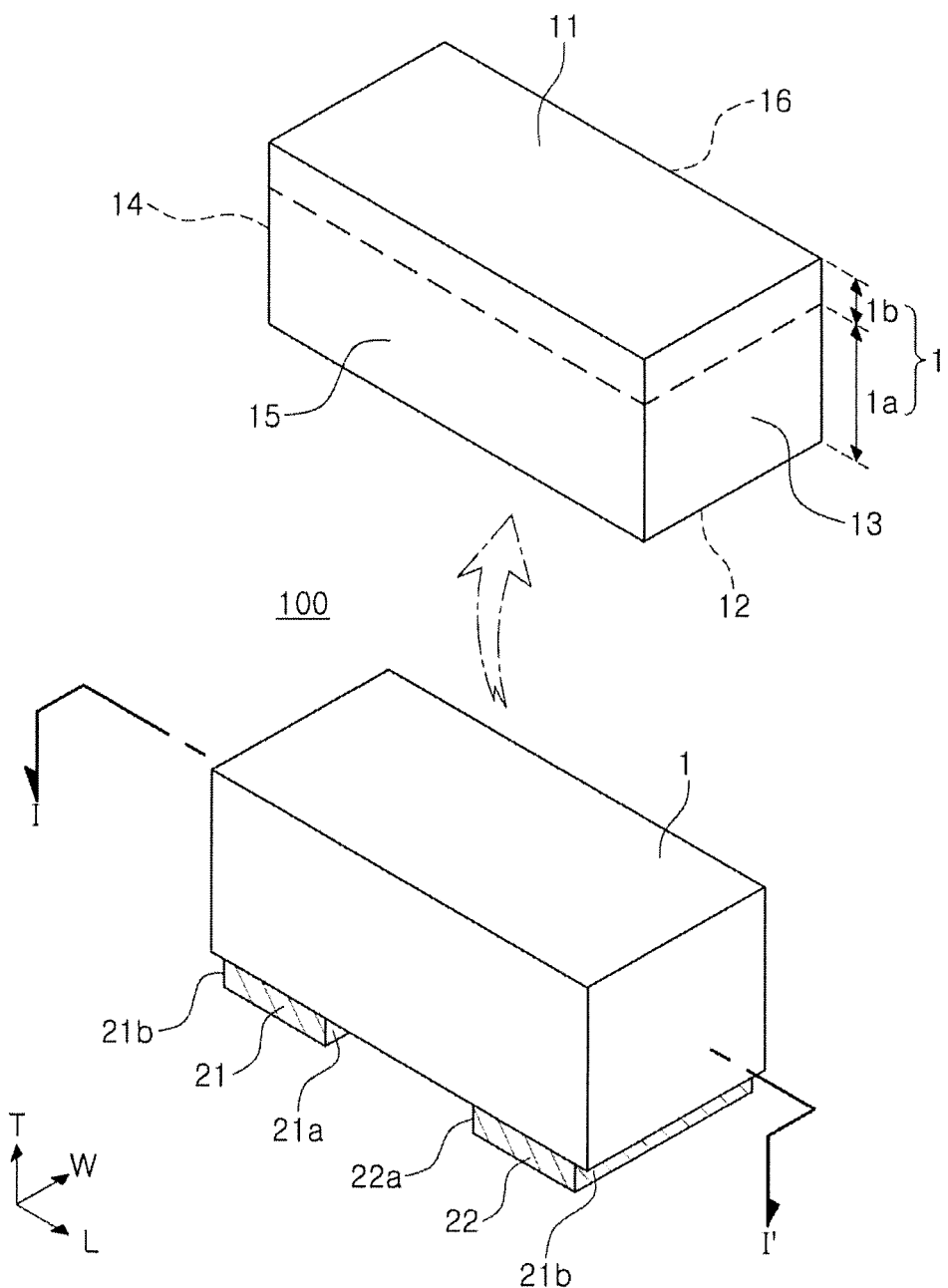
FIG. 1 is a perspective view illustrating an example of a multilayer electronic component according to exemplary embodiments of the present disclosure.

FIG. 1 is a perspective view illustrating a multilayer electronic component according to exemplary embodiments of the present disclosure and, specifically, FIG. 1 is a schematic perspective view of a 2-terminal capacitor including two external electrodes in a multilayer ceramic capacitor.

Referring to FIG. 1, a multilayer electronic component according to exemplary embodiments of the present disclosure includes a body 1 forming an overall appearance, and first and second external electrodes 21 and 22 disposed on an external surface of the body 1.

The body 1 includes an active region 1a, in which first and second internal electrodes overlap, and an upper cover layer 1b disposed above the active region and including a plurality of dielectric sheets stacked without printing an internal electrode.

The body 1 includes upper and lower surfaces 11 and 12 facing each other in a thickness (T) direction, first and second side surfaces 13 and 14 facing each other in a length (L) direction, and first and second end surfaces 15 and 16 facing each other in a width (W) direction, having a substantially hexahedral shape, but without being limited thereto. The thickness direction of the body 1 refers to a substantially multilayer direction in which a plurality of dielectric layers are stacked, and the lower surface of the body 1 refers to a mounting surface disposed to be most adjacent to a board in a facing manner when the multilayer electronic component is mounted on the board.

First and second external electrodes 21 and 22 are disposed on the lower surface of the body 1 and do not contact external surfaces 11, 13, 14, 15 and 16, only contacting the lower surface of the body 1. One end portion 21a of the first external electrode 21 is disposed to face one end portion 22a of the second external electrode on the lower surface 12 of the body 1. Meanwhile, the other end portion 21b of the first external electrode 21, opposing the one end portion 21a of the first external electrode 21, is disposed on an inner side of one edge of the lower surface 12 of the body 1. Meanwhile, although not shown, the other end portion 21b of the first external electrode 21 may not need to extend to an external surface other than the lower surface 12, and may be disposed to overlap one edge of the lower surface 12.

Similarly, the other end, or another, portion 22b of the second external electrode 22, opposing the one end portion 22a of the second external electrode 22, is disposed on an inner side of one edge of the lower surface 12 of the body 1. Meanwhile, although not shown, the other end portion 22b of the second external electrode 22 may not extend to an external surface other than the lower surface 12, and the other end portion 22b of the second external electrode 22 may be disposed to overlap one edge of the lower surface 22.

Figure 2:
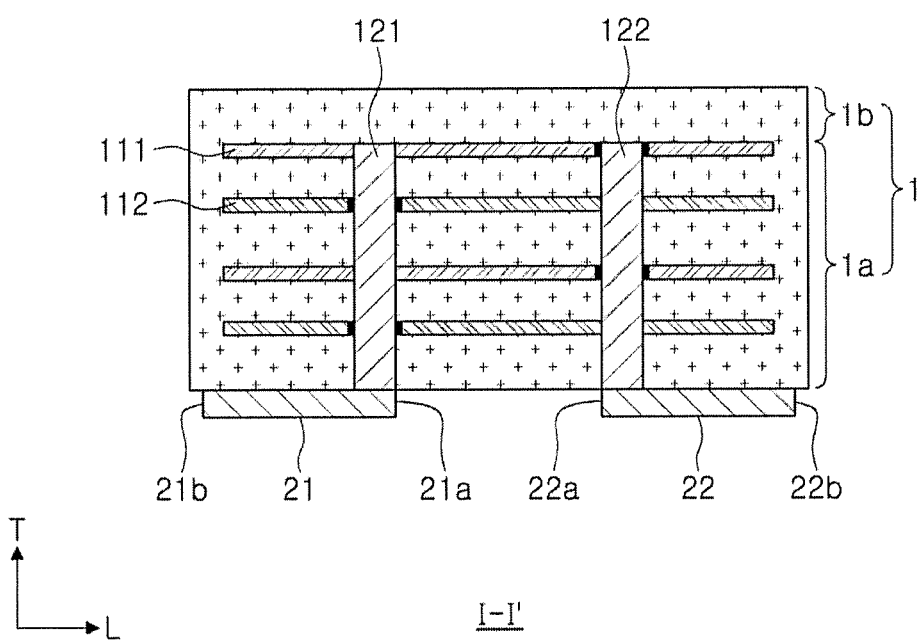
FIG. 2 is a cross-sectional view of the multilayer electronic component taken along line I-I' of FIG. 1.

FIG. 2 is a cross-sectional view of the multilayer electronic component, taken along line I-I' of FIG. 1. Referring to FIG. 2, a specific dispositional relationship between the first and second internal electrodes and first and second vias disposed within the body 1 is illustrated.

Referring to FIG. 2, a plurality of dielectric layers and first and second internal electrodes 111 and 112 separated by the plurality of dielectric layers are provided within the body 1.

The dielectric layers are formed by sintering a ceramic green sheet including dielectric ceramics such as $BaTiO_3$-based-, $Ba(Ti, Zr)O_3$-based- or $(Ba, Ca)TiO_3$-based ceramics, for example, and, within the body, the dielectric layers are integrated such that boundaries therebetween may not be readily apparent.

The first and second internal electrodes 111 and 112 are charged with opposite polarities and are formed by printing conductive paste including, for example, nickel (Ni), on a ceramic green sheet to form a pattern, and sintering the pattern including the ceramic green sheet. The first and second internal electrodes 111 and 112 are alternately disposed in a multilayer direction, and a region in which the first and second internal electrodes 111 and 112 overlap each other is an active region substantially forming the capacitance within the multilayer body.

The first and second internal electrodes 111 and 112 are electrically connected to the first and second external electrodes through a first via 121 and a second via 122, respectively.

The first via 121 is disposed to be substantially perpendicular to the first internal electrode 111, and the second via 122 is disposed to be substantially perpendicular to the second internal electrode 112.

Referring to a structure in which the first and second vias 121 and 122 and the first and second internal electrodes 111 and 112 are connected, the first via 121 alternately penetrates through a first through portion 111a included in the first internal electrode 111 and a third through portion 112a included in the second internal electrode 112, and the second via 122 alternately penetrates through a second through portion 111b included in the first internal electrode 111 and a fourth through portion 112b included in the second internal electrode 112.

The first via 121 serves to connect the first internal electrode 111 and the first external electrode 21, and thus the first via 121 is required to be electrically disconnected from the second internal electrode 112. Thus, a dielectric material is required to be disposed at the edges of the third through portion 112a, penetrated by the first via 121. Any material may be used as the dielectric material as long as it does not allow the second internal electrode 112 and the first via 121 to be electrically connected. For example, the dielectric material may include a material including dielectric ceramics such as $BaTiO_3$-based-, $Ba(Ti, Zr)O_3$-based- or $(Ba, Ca)TiO_3$-based dielectric ceramics.

Similarly, since the second via 122 serves to connect the second internal electrode 112 and the second external electrode 22, the second via 122 is required to be electrically disconnected from the first internal electrode 111. Thus, a dielectric material is required to be disposed at the edges of the second through portion 111b, penetrated by the second via 122. Any material may be used as the dielectric material as long as it does not allow the first internal electrode 111 and the second via 122 to be electrically connected. For example, the dielectric material may include a material including dielectric ceramics such as $BaTiO_3$-based-, $Ba(Ti, Zr)O_3$-based- or $(Ba, Ca)TiO_3$-based dielectric ceramics.

Since the first via 121 is required to be electrically connected to the first internal electrode 111, edges of the first through portion 111a of the first internal electrode 111, penetrated by the first via 121, may be in contact with an external surface of the first via 121. In cases where the edges of the first through portion 111a are not in contact with the external surface of the first via 121, a conductive material may be disposed at the edges of the first through portion 111a to electrically connect the first via 121 and the first through portion 111a. Here, the conductive material may include nickel (Ni) forming the first internal electrode in, for example.

Since the second via 122 is required to be electrically connected to the second internal electrode 112, edges of the fourth through portion 112b of the second internal electrode 112, penetrated by the second via 122, may be in contact with an external surface of the second via 122. In cases where the edges of the fourth through portion 112b are not in contact with the external surface of the second via 122, a conductive material may be disposed at the edges of the fourth through portion 112b to electrically connect the second via 122 and the fourth through portion 112b. Here, the conductive material may include nickel (Ni) forming the second internal electrode 112, for example.

When the first via 121 is connected to the first external electrode 21, a lead portion of the first via 121, leading to an external surface of the body, is connected to one end portion 21a of the first external electrode 21, and when the second via 122 is connected to the second external electrode 22, a lead portion of the second via 122, leading to an external surface of the body, is connected to one end portion 22a of the second external electrode 22.

Since the lead portion of the first via 121 is connected to the one end portion 21a of the first external electrode 21, and the lead portion of the second via 122 is connected to one end portion 22a of the second external electrode 22, a distance between the first and second vias 121 and 122 is substantially equal to a distance between the first and second external electrodes 21 and 22.

Since the first and second vias 121 and 122 are separated to a degree substantially equal to a distance between the first and second external electrodes 21 and 22, a path of a current flowing between the first and second external electrodes 21 and 22 forms a shortest path. As a result, a current path of the multilayer electronic component is shortened and ESL may be reduced.

Referring to FIG. 2, the first via 121 and the first external electrode 21 are connected to form an "L" shape, and similarly the second via 122 and the second external electrode 122 are also connected to form an "L" shape.

Also, the first via 121 extends to a point from a lower surface of the body to a point where the uppermost first internal electrode ill is disposed, and the second via 122 extends from a lower surface of the body to a point where the uppermost second internal electrode 112 is disposed. Although not shown, the first via and the second via may extend to above the first internal electrode 111 in the via's uppermost part, and above the second internal electrode 112 in the via's uppermost part, to reach an internal point of the upper cover layer, according to a change in design by a person skilled in the art, but, in this case, the first and second vias 121 and 122 are not exposed to an upper surface of the body.

Figure 3A:
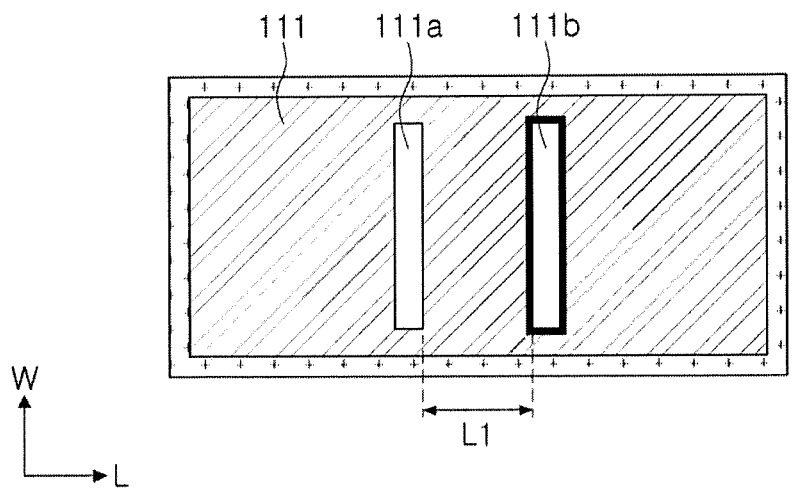
FIG. 3A is a view illustrating an example of a first internal electrode of FIG. 1.
Figure 3B:
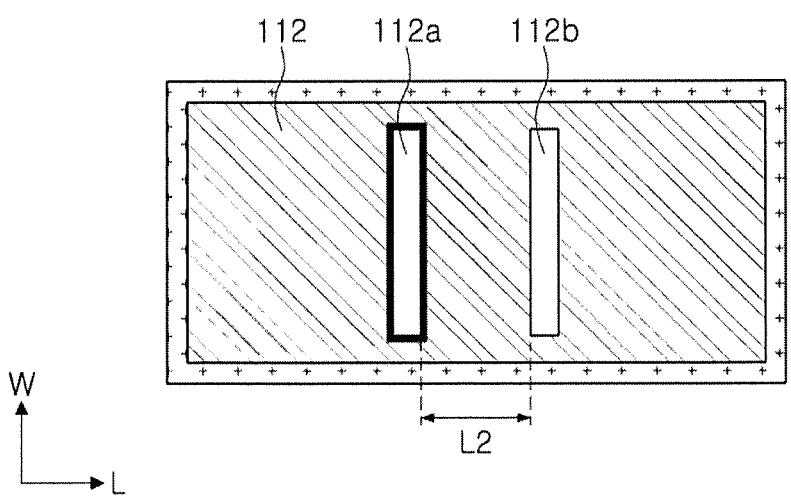
FIG. 3B is a view illustrating an example of a second internal electrode of FIG. 1.

FIG. 3A is a view illustrating an example of a first internal electrode of FIG. 1, and FIG. 3B is a view illustrating an example of a second internal electrode of FIG. 1. The first and second internal electrodes 111 and 112 are illustrated as being disposed on a dielectric sheet.

Referring to FIG. 3A, the first internal electrode 111 has a cross-sectional shape substantially corresponding to a cross-section of a lower surface of the body, and edges of the first internal electrode ill are disposed on an inner side of edges of a dielectric sheet on which the first internal electrode 111 is printed. As a result, there is no possibility that the first internal electrode 111 may be directly exposed to an external surface of the body.

The first internal electrode 111 includes first and second through portions 111a and 111b. The first and second through portions 111a and 111b have a rectangular cross-section extending in a width (W) direction of the body. In the first and second through portions 111a and 111b, a length of the body in the width direction is longer than a length of the body in the length direction, and thus the first and second through portions 111a and 111b may have an overall slit shape.

Since the lengths of the first and second through portions 111a and 111b extending the width (W) of the body are shorter than the length of the first internal electrode extending in the width direction of the body, both the first and second through portions 111a and 111b may be disposed on an inner side of the edges of the first internal electrode 111.

Since the edges of the first through portion 111a of the first internal electrode 111 are formed of a conductive material and the edges of the second through portion 111b are formed of a dielectric material, the first and second through portions 111a and 111b may be distinct in appearance.

Meanwhile, a distance L1, between the first through portion 111a and the second through portion 111b of the first internal electrode 111, may be substantially equal to a distance between one end portion of the first external electrode 21 and one end portion of the second external electrode 22, forming a minimum current path length.

Here, the distance between the both through portions 111a and 111b refers to a distance between the edges, only, of the through portions 111a and 111b, excluding the conductive material (here, the conductive material also includes a conductive material included in the internal electrodes including the through portions) and the dielectric material disposed at the edges of the through portions.

Referring to FIG. 3B, the second internal electrode 112 includes third and fourth through portions 112a and 112b. Since the third through portion 112a has substantially the same cross-sectional shape and function as the second through portion 111b of the first internal electrode 111, and the fourth through portion 112b has substantially the same cross-sectional shape and function as the first through portion 111a of the first internal electrode 111, the descriptions in this application applied to the second and first through portions 111b and 111a may also be applied to the third and fourth through portions 112a and 112b as is, and thus redundant descriptions will be omitted.

Meanwhile, a distance L2 between the third through portion 112a and the fourth through portion 112b of the second internal electrode 112 may be substantially equal to a distance between one end portion of the first external electrode 21 and one end portion of the second external electrode 22, forming a minimum current path length.

Figure 4A:
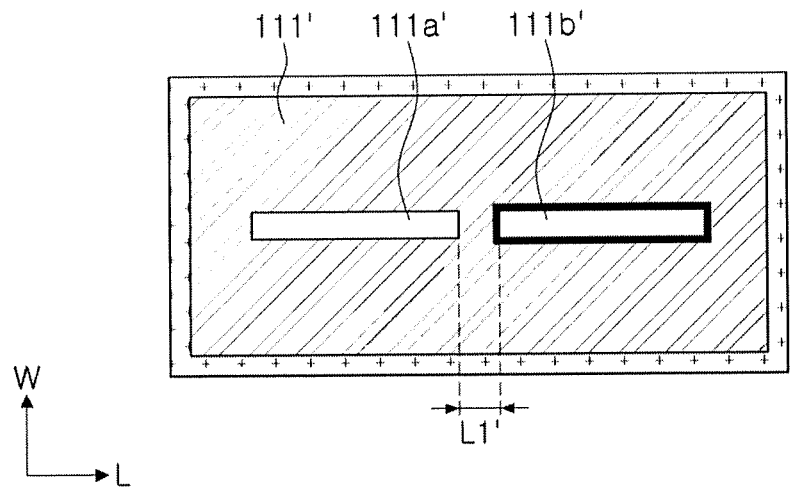
FIGS. 4A and 4B are views illustrating modified examples of the internal electrodes of FIGS. 3A and 3B, respectively.
Figure 4B:
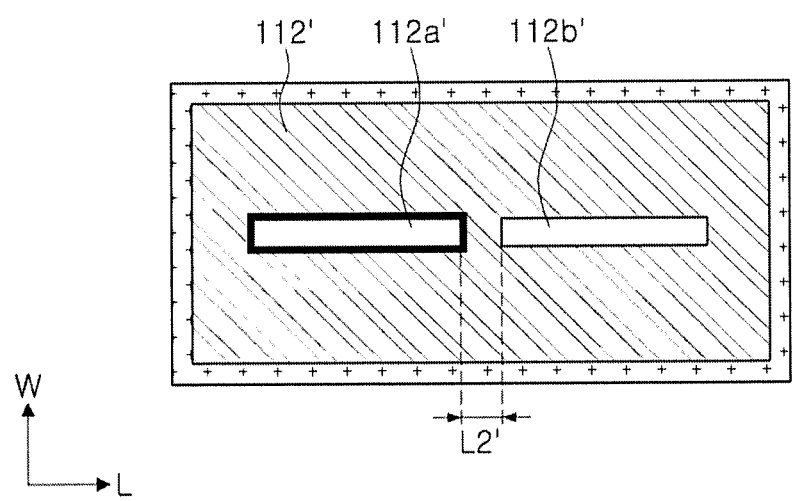

FIGS. 4A and 4B are views illustrating modified examples of the internal electrodes of FIGS. 3A and 3B, respectively. As above, descriptions of FIGS. 4A and 4B similar to, or the same as, those of FIGS. 3A and 3B will be omitted.

In FIG. 4A, a first through portion 111a' and a second through portion 111b' of a first internal electrode 111' have a rectangular cross-section, of which a length extending in the length L direction of the body is shorter than a length extending in the width W direction of the body, unlike the first through portion 111a and the second through portion 111b described above.

Similarly, in FIG. 4B, a third through portion 112a' and a fourth through portion 112b' of a second internal electrode 112' have a rectangular cross-section in which a length extending in the length L direction of the body is longer than a length extending in the width W direction of the body, unlike the third through portion 112a and the fourth through portion 111b described above.

Referring to FIGS. 4A and 4B, a distance L1' between the first and second through portions 111a' and 111b' of the first internal electrode 111' is substantially the same as a distance between one end portion of the first external electrode 21 and one end portion of the second external electrode 22, and a distance L2' between the third and fourth through portions 112a' and 112b' of the second internal electrode 112' is substantially the same as a distance between one end portion of the first external electrode 21 and one end portion of the second external electrode 22.

Figure 5A:
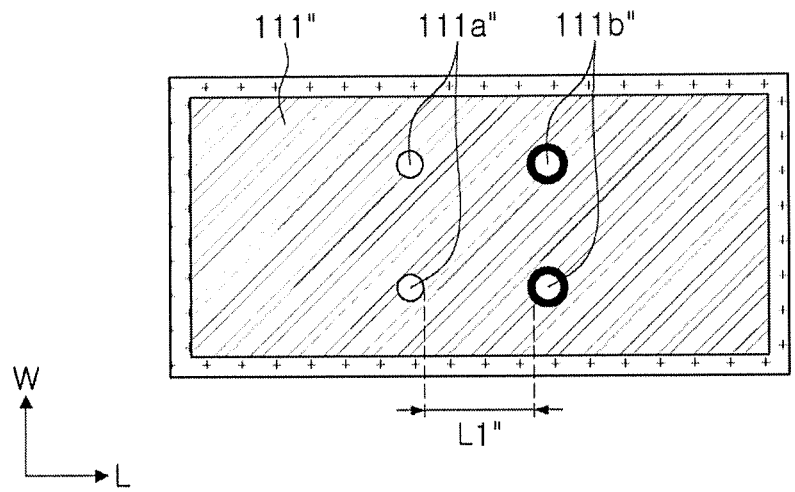
FIGS. 5A and 5B are views illustrating other modified examples of the internal electrodes of FIGS. 3A and 3B, respectively.
Figure 5B:
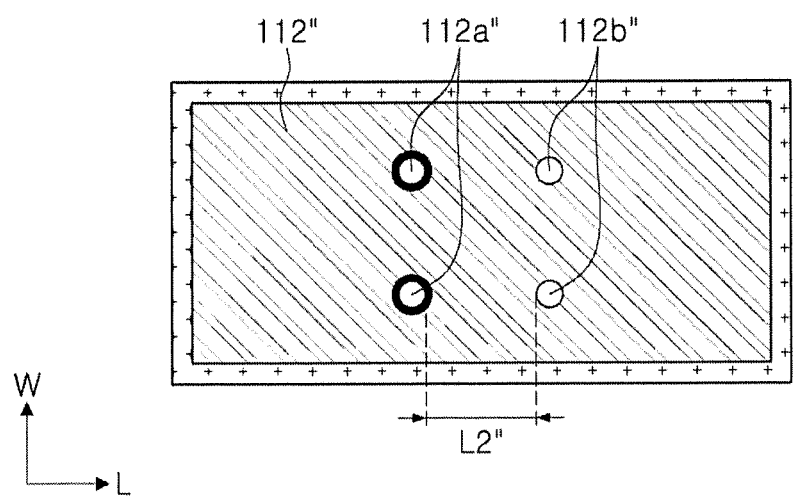

FIGS. 5A and 5B are views illustrating modified examples of the internal electrodes of FIGS. 3A and 3B, respectively.

Referring to FIG. 5A, a first through portion 111a" of a first internal electrode 111" includes a plurality of circular through holes. The circular through holes are arranged in a row in the width W direction of the body and spaced apart from each other at a predetermined interval. Similarly, a second through portion 111b" of the first internal electrode 111" includes a plurality of circular through holes. The circular through holes are arranged in a row in the width W direction of the body and spaced apart from each other at a predetermined interval.

Referring to FIG. 5B, each of a third through portion 112a" and a fourth through portion 112b" of a second internal electrode 112" includes a plurality of circular through holes, and the circular through holes are arranged in a row in the width W direction and spaced apart from each other at a predetermined interval.

Also, in FIGS. 5A and 5B, a distance L1" between the first and second through portions of the first internal electrode and a distance L2" between the third and fourth through portions of the second internal electrode are substantially the same as a distance between one end portion of the first external electrode 21 and one end portion of the second external electrode 22, thus controlling a path of a current between the first and second external electrodes 21 and 22 to be a shortest distance.

According to the two-terminal multilayer capacitor described above, an unnecessarily generated parasitic current may be removed by forming the external electrodes as lower surface electrodes, an area in which the internal electrodes overlap, within the same chip size as that used in the related art, may be maximally utilized, and a chip size for forming the same capacitance may be minimized. In addition, since the distance between the first and second vias is controlled to be minimal, while also minimizing the distance between the first and second external electrodes forming opposite polarities, a current loop and ESL may be minimized.

Three-Terminal Multilayer Electronic Component

A three-terminal multilayer electronic component according to examples of the present disclosure will be described. The same descriptions of the three-terminal multilayer electronic component as those of the two-terminal multilayer electronic component described above will be omitted.

Figure 6:
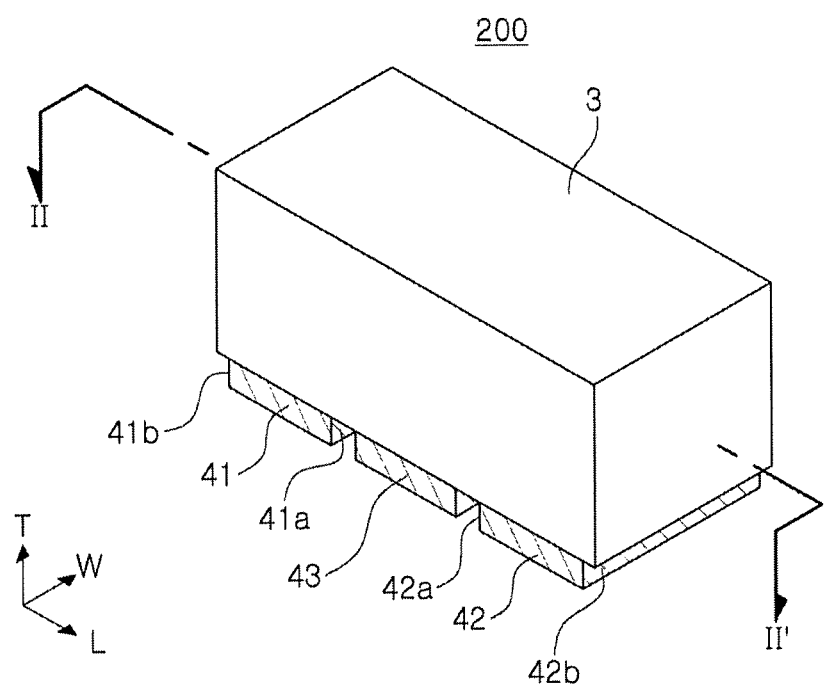
FIG. 6 is a schematic perspective view of a multilayer electronic component according to exemplary embodiments of the present disclosure.

FIG. 6 is a perspective view of a multilayer electronic component according to exemplary embodiments of the present disclosure. Referring to FIG. 6, a three-terminal multilayer electronic component 200 according to examples of the present disclosure includes a body 3 and first to third external electrodes 41, 42 and 43 disposed on a lower surface of the body 3.

On the lower surface of the body, the third external electrode 43 is interposed between the first and second external electrodes 41 and 42.

The first and second external electrodes 41 and 42 are charged with the same polarity, and the third external electrode 43 acts with polarity opposite to those of the first and second external electrodes 41 and 42.

The first and second external electrodes 41 and 42 are electrically connected to a first internal electrode, and the third external electrode 43 is electrically connected to a second internal electrode.

The first internal electrode is electrically connected to the first external electrode 41 through a first via (not shown), and the first internal electrode is electrically connected to the second external electrode 42 through a second via (not shown). The first and second vias are disposed to be perpendicular to the first and second external electrodes 41 and 42, and a lead portion of the first via is connected to one end portion of the first external electrode 41, and a lead portion of the second via is connected to one end portion of the second external electrode 42.

The second internal electrode is electrically connected to the third external electrode 43 through third and fourth vias (not shown). A lead portion of the third via is connected to one end portion of the third external electrode 43, and a lead portion of the fourth via is connected to the other end portion of the third external electrode 43, facing the one end portion of the external electrode 43 in a length direction of the body 3. As a result, a length of the third external electrode 43 extending in the length direction is substantially equal to a distance between the third and fourth vias in the length direction.

Figure 7A:
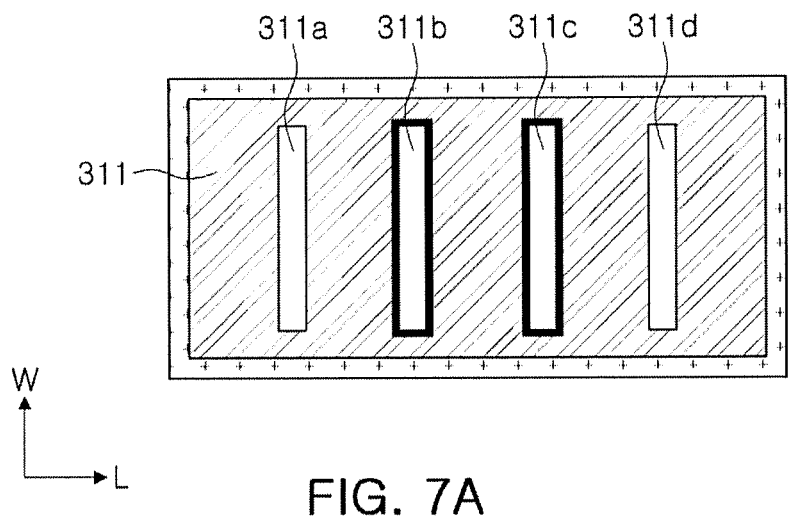
FIG. 7A is a view illustrating a first internal electrode of FIG. 6
Figure 7B:
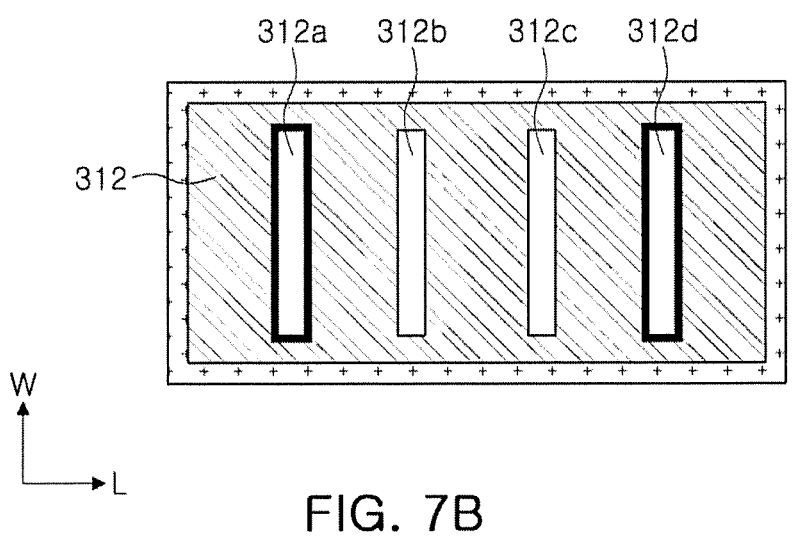
FIG. 7B is a view illustrating a second internal electrode of FIG. 6.

FIG. 7A is a view illustrating an example of a first internal electrode of FIG. 6, and FIG. 7B is a view illustrating an example of a second internal electrode of FIG. 6. The first and second internal electrodes are in a state of being printed on a dielectric green sheet.

Referring to FIG. 7A, a first internal electrode 311 includes first to fourth through portions 311a, 311b, 311c and 311d. A conductive material is provided to edges of the first through portion 311a and a fourth through portion 311d of the first internal electrode 311, to allow first and second vias, to penetrate through the first through portion 311a and the fourth through portion 311d, respectively, to electrically connect the first internal electrode 311 and a first external electrode. Meanwhile, a dielectric material is provided to edges of the second through portion 311b and the third through portion 311c of the first internal electrode 311, so that third and fourth vias, penetrating through the second and fourth through portions 311b and 311c, respectively, are not electrically connected to the first internal electrode 311. Each of the first to fourth through portions 311a, 311b, 311c and 311d of the first internal electrode 311 has a rectangular slit shape extending in the width W direction. The first to fourth through portions 311a, 311b, 311c and 311d are spaced apart from each other in the length direction of the body.

Referring to FIG. 7B, a second internal electrode 312 includes fifth to eighth through portions 312a, 312b, 312c and 312d. A conductive material is provided to edges of the sixth through portion 312b and a seventh through portion 312c of the second internal electrode 312, to allow third and fourth vias, to penetrate through the sixth through portion 312b and the seventh through portion 312c, respectively, to electrically connect the second internal electrode 312 and a third external electrode. Meanwhile, a dielectric material is provided to edges of the fifth through portion 312a and the eighth through portion 312d of the second internal electrode 312, so that first and second vias, penetrating through the fifth and eighth through portions 312a and 312d, respectively, are not electrically connected to the second internal electrode 312. Each of the fifth to eighth through portions 312a, 312b, 312c and 312d of the second internal electrode 312 has a rectangular slit shape extending in the width W direction. The fifth to eighth through portions 312a, 312b, 312c and 312d are spaced apart from each other in the length direction of the body.

Figure 8A:
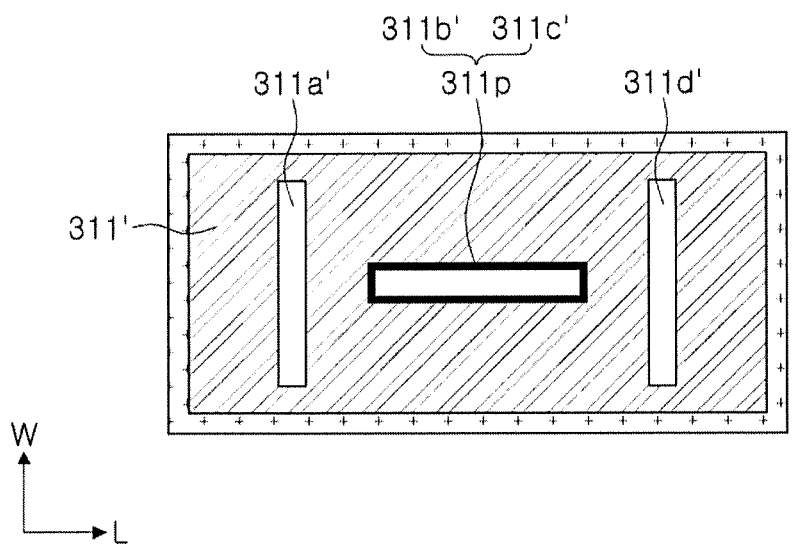
FIGS. 8A and 8B are views illustrating exemplary electrode patterns of FIGS. 7A and 7B, respectively.
Figure 8B:
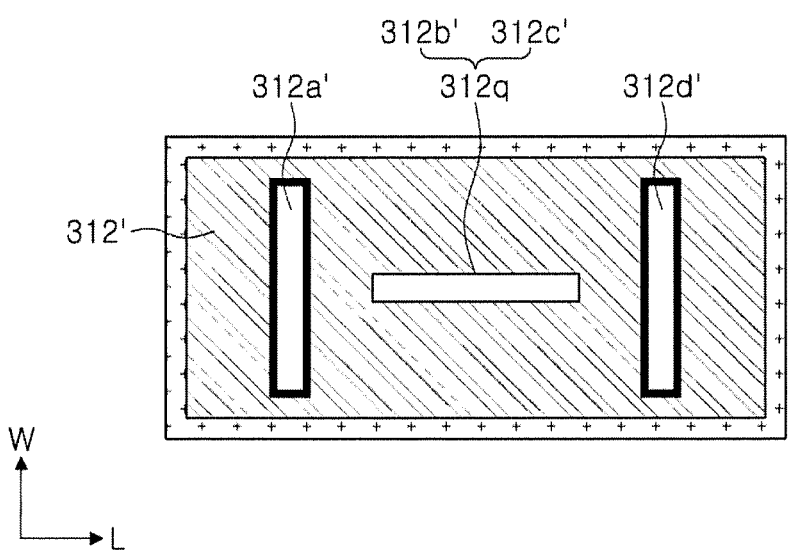

FIGS. 8A and 8B are views illustrating exemplary patterns of FIGS. 7A and 7B, respectively.

Referring to FIG. 8A, as for through portions of a first internal electrode 311', the second and third through portions 311b and 311c of FIG. 7A are merged. Here, merging refers to combining the second through portion and the third through portion to form a single through portion. Here, when the through portion of the first internal electrode 311', formed by merging the second and third through portions, is a first merged through portion 311p, the first merged through portion 311p has a rectangular slit shape extending in the length direction of the body. Both third and fourth vias (not shown) electrically connecting a second internal electrode and a third external electrode pass through the first merged through portion 311p, and a dielectric material may be provided to the edges of the first merged through portion 311p to prevent the first internal electrode and the third and fourth vias from being electrically connected. Although not shown, since both the third and fourth vias pass through the first merged through portion 311p, the third and fourth vias may also be merged, like the first merged through portion 311p.

Referring to FIG. 8B, as for through portions of a second internal electrode 312', the sixth and seventh through portions 312b and 312c of FIG. 7B are merged. Here, merging refers to combining the sixth through portion and the seventh through portion to form a single through portion, like the first merged through portion 311p. Here, when the through portion of the second internal electrode 312', formed by merging the sixth and seventh through portions, is a second merged through portion 312q, the second merged through portion 312q has a rectangular slit shape extending in the length direction of the body. Both third and fourth vias (not shown) electrically connecting the second internal electrode and a third external electrode pass through the second merged through portion 312q, and a conductive material may be provided to the edges of the second merged through portion 312q, to allow the second internal electrode 312' and the third and fourth vias to be electrically connected.

Figure 9A:
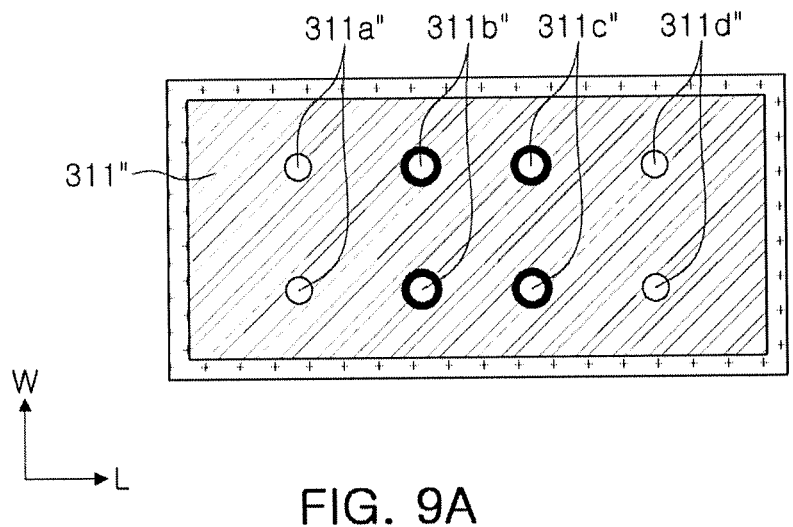
FIGS. 9A and 9B are views illustrating exemplary electrode patterns of FIGS. 7A and 7B, respectively.
Figure 9B:
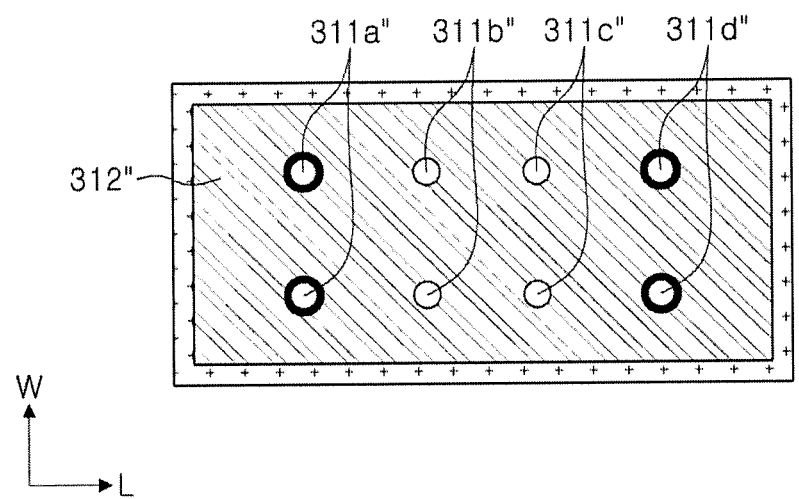

FIGS. 9A and 9B are views illustrating exemplary patterns of FIGS. 7A and 7B, respectively.

The first to fourth through portions 311a, 311b, 311c, and 311d of the first internal electrode 311 of FIG. 7A are modified to become first to fourth through portions 311a", 311b", 311c" and 311d" of a first internal electrode 311" of FIG. 9A. The first to fourth through portions 311a", 311b", 311c", and 311d" of FIG. 9A include a plurality of through holes, and the through holes of the through portions are arranged to be spaced apart from each other in the width direction of the body.

The fifth to eighth through portions 312a, 312b, 312c and 312d of the second internal electrode 312 of FIG. 7B are modified to become fifth to eighth through portions 312a", 312b", 312c" and 312d" of a second internal electrode 312" of FIG. 9B. The fifth to eighth through portions 312a", 312b", 312c" and 312d" of FIG. 9B include a plurality of through holes, and the through holes of the through portions are arranged to be spaced apart from each other in the width direction of the body.

FIGS. 8A, 8B, 9A and 9B illustrate modified examples of shapes of the plurality of through portions, and here, in FIGS. 8A, 8B, 9A and 9B, referring to a distance between adjacent vias, distances between the through portions may be controlled such that distances between adjacent external electrodes electrically connected to the vias are substantially the same.

According to the three-terminal multilayer capacitor described above, an unnecessarily generated parasitic current may be removed by forming the external electrodes as lower surface electrodes, an area in which the internal electrodes overlap within the same chip size may be maximally utilized, and a chip size for forming the same capacitance may be minimized. In addition, since the distance between the vias connected to the external electrodes is controlled to be at a minimum, while minimizing both the distance between the first and third external electrodes and the distance between the second external electrode and the third external electrode forming the opposite polarities, an overall current loop and ESL may be minimized.

As set forth above, according to exemplary embodiments of the present disclosure, a multilayer electronic component with a reduced parasitic current and ESL, while maximizing an overlapping area of the internal electrodes, forming capacitance for the same chip size, may be provided.

While exemplary embodiments have been shown and described above, it will be apparent to those skilled in the art that modifications and variations could be made without departing from the scope of the present disclosure, as defined by the appended claims.

What is claimed is:

1. A multilayer electronic component, comprising:
a body having a multilayer structure which includes:
a plurality of dielectric layers; and
first and second internal electrodes separated by the plurality of dielectric layers; and
first and second external electrodes disposed on one surface of the body and connected to the first and second internal electrodes, respectively, the first internal electrode and the first external electrode being connected by a first via disposed within the body, the second internal electrode and the second external electrode being connected by a second via disposed within the body, the first internal electrode including first and second through portions, and the second internal electrode including third and fourth through portions, the first via penetrating alternately through the first through portion and the third through portion, the second via penetrating alternately through the second through portion and the fourth through portion, and a lead portion of the first via being connected to one end portion of the first external electrode, and a lead portion of the second via being connected to one end portion of the second external electrode,
wherein the one end portion of the first external electrode and the one end portion of the second external electrode are arranged so that a distance therebetween is equal to or greater than a distance between the first via which is directly connected to the first external electrode and the second via which is directly connected to with the second external electrode.

2. The multilayer electronic component of claim 1, wherein the one end portion of the first external electrode and the one end portion of the second external electrode are disposed to face each other on the one surface of the body,
  wherein another end portion of the first external electrode facing the one end portion of the first external electrode is disposed to overlap an edge of the one surface of the body or disposed on an inner side of the edge, and
  wherein another end portion of the second external electrode facing the one end portion of the second external electrode is disposed to overlap the edge of the one surface of the body or disposed on an inner side of the edge.

3. The multilayer electronic component of claim 1, wherein the first internal electrode and the second internal electrode are parallel to the one surface of the body, and
  wherein the first via is perpendicular to the first internal electrode, and the second via is perpendicular to the second internal electrode.

4. The multilayer electronic component of claim 1, wherein the first via and the second via are parallel to each other, and
  wherein the distance between the first via and the second via is equal to the distance between the one end portion of the first external electrode and the one end portion of the second external electrode.

5. The multilayer electronic component of claim 1, wherein an edge of the first through portion of the first internal electrode is directly connected to the first via or is indirectly connected through a conductive material disposed at the edge of the first through portion, and
  wherein an edge of the fourth through portion of the second internal electrode is directly connected to the second via or is indirectly connected through a conductive material disposed at the edge of the fourth through portion.

6. The multilayer electronic component of claim 1, wherein a dielectric material is disposed at the edge of the second through portion of the first internal electrode, and
  wherein a dielectric material is disposed at the edge of the third through portion of the second internal electrode.

7. The multilayer electronic component of claim 1, wherein the first via and the first external electrode are perpendicular to each other, and
  wherein the second via and the second external electrode are perpendicular to each other.

8. The multilayer electronic component of claim 1, wherein the first via extends from one surface of the body to a point where an uppermost first internal electrode is disposed or to an internal point of an upper cover layer above the uppermost first internal electrode, and
  wherein the second via extends from one surface of the body to a point where an uppermost second internal electrode is disposed or to an internal point of an upper cover layer above the uppermost second internal electrode.

9. The multilayer electronic component of claim 1, wherein the body includes an upper surface and a lower surface facing each other in a thickness direction, a first surface and a second surface facing each other in a length direction, and a third surface and a fourth surface facing each other in a width direction, and
  wherein one surface of the body on which the first and second external electrodes are disposed is the lower surface of the body.

10. The multilayer electronic component of claim 9, wherein the first to fourth through portions have a rectangular cross-section in which a length thereof extending in the width direction of the body is longer than a length thereof extending in the length direction of the body.

11. The multilayer electronic component of claim 9, wherein the first to fourth through portions have a rectangular cross-section in which a length thereof, extending in the length direction of the body, is longer than a length thereof, extending in the width direction of the body.

12. The multilayer electronic component of claim 9, wherein the first to fourth through portions each include a plurality of circular through holes, and
  wherein the circular through holes of each of the first to fourth through portions are arranged in a row in the width direction of the body and spaced apart from each other at a predetermined interval.

13. A multilayer electronic component, comprising:
a body having a multilayer structure including which includes:
a plurality of dielectric layers; and
first and second internal electrodes separated by the plurality of dielectric layers; and
first and second external electrodes disposed on one surface of the body and connected to the first and second internal electrodes, respectively, the first internal electrode and the first external electrode being connected by a first via disposed within the body, the second internal electrode and the second external electrode being connected by a second via disposed within the body, the first internal electrode including first and second through portions, and the second internal electrode including third and fourth through portions, the first via penetrating alternately through the first through portion and the third through portion, the second via penetrating alternately through the second through portion and the fourth through portion, and a lead portion of the first via being connected to one end portion of the first external electrode, and a lead portion of the second via being connected to one end portion of the second external electrode,
wherein the first via and the second via are parallel to each other, and
wherein the distance between the first via and the second via is equal to the distance between the one end portion of the first external electrode and the one end portion of the second external electrode.

* * * * *